(12) United States Patent
Cook et al.

(10) Patent No.: US 8,554,860 B1
(45) Date of Patent: Oct. 8, 2013

(54) TRAFFIC SEGMENTATION

(75) Inventors: Fred S. Cook, Olathe, KS (US); Durga P. Satapathy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2331 days.

(21) Appl. No.: 10/656,058

(22) Filed: Sep. 5, 2003

(51) Int. Cl.
*G06F 15/16* (2006.01)

(52) U.S. Cl.
USPC .......................................................... 709/207

(58) Field of Classification Search
None
See application file for complete search history.

(56) References Cited

U.S. PATENT DOCUMENTS

| | | | | |
|---|---|---|---|---|
| 5,276,899 A * | 1/1994 | Neches | ........................ | 709/240 |
| 5,367,523 A * | 11/1994 | Chang et al. | .................... | 370/235 |
| 5,699,521 A * | 12/1997 | Iizuka et al. | ................... | 709/240 |
| 5,727,151 A * | 3/1998 | Sugahara et al. | ............. | 709/207 |
| 5,761,534 A * | 6/1998 | Lundberg et al. | ............... | 710/50 |
| 5,867,731 A * | 2/1999 | Williams et al. | ................ | 710/29 |
| 5,901,156 A * | 5/1999 | Botzenhardt et al. | ......... | 714/748 |
| 5,903,735 A * | 5/1999 | Kidder et al. | ................. | 709/240 |
| 5,920,705 A * | 7/1999 | Lyon et al. | ..................... | 709/240 |
| 6,141,322 A * | 10/2000 | Poretsky | ........................ | 370/231 |
| 6,147,970 A * | 11/2000 | Troxel | ............................ | 370/235 |
| 6,292,489 B1 * | 9/2001 | Fukushima et al. | ........... | 370/401 |
| 6,324,570 B1 * | 11/2001 | Tonchev et al. | ............... | 709/207 |
| 6,426,943 B1 * | 7/2002 | Spinney et al. | ............... | 370/235 |
| 6,449,253 B1 * | 9/2002 | Ott | ................................. | 370/231 |
| 6,469,983 B2 * | 10/2002 | Narayana et al. | ............. | 370/231 |
| 6,487,170 B1 * | 11/2002 | Chen et al. | ..................... | 370/231 |
| 6,584,509 B2 * | 6/2003 | Putzolu | .......................... | 709/240 |
| 6,622,160 B1 * | 9/2003 | Horvitz | .......................... | 709/206 |
| 6,633,564 B1 * | 10/2003 | Steer et al. | ..................... | 370/389 |
| 6,748,435 B1 * | 6/2004 | Wang et al. | .................... | 709/225 |
| 6,845,105 B1 * | 1/2005 | Olsson et al. | ................. | 370/469 |
| 6,859,842 B1 * | 2/2005 | Nakamichi et al. | ........... | 709/238 |
| 6,877,038 B2 * | 4/2005 | Hakenberg et al. | ........... | 709/232 |
| 6,901,452 B1 * | 5/2005 | Bertagna | ........................ | 709/240 |
| 6,973,085 B1 * | 12/2005 | Acharya | ........................ | 370/392 |
| 7,027,402 B2 * | 4/2006 | Hedden | ......................... | 370/238 |
| 7,174,374 B2 * | 2/2007 | Wang et al. | .................... | 709/223 |
| 7,188,188 B1 * | 3/2007 | Madhavapeddi et al. | ..... | 709/238 |
| 2002/0087715 A1 * | 7/2002 | De Cnodder et al. | ......... | 709/235 |
| 2002/0136217 A1 * | 9/2002 | Christensen | ................... | 370/393 |
| 2003/0133411 A1 * | 7/2003 | Ise et al. | ........................ | 370/230 |
| 2004/0052214 A1 * | 3/2004 | Teh et al. | ....................... | 370/238 |
| 2006/0168336 A1 * | 7/2006 | Koyanagi et al. | ............. | 709/240 |

OTHER PUBLICATIONS

Tutorial: Interworking Switched Circuit and Voice-over-Ip Networks, Performance Technologies, Inc., Aug. 22, 2001.
SS7 Tutorial, Performance Technologies, Inc., Aug. 22, 2001.
Zvolve, Executive Summary on Conscious [online], Retrieved from the internet on Nov. 18, 2002, http://www.zvolve.com/.
Zvolve, White Paper: The Need for Business Driven Real-Time Traffic Engineering [online], Retrieved from the internet on Nov. 18, 2002, http://www.zvolve.com/.
Zvolve, Frequently Asked Questions, Conscious: The Business-Driven Real-Time Traffic Engineering System [online], Retrieved from the internet on Nov. 18, 2002, http://www.zvolve.com/.

(Continued)

*Primary Examiner* — Brian P Whipple

(57) ABSTRACT

An apparatus and method for forwarding message packets over a network having at least one dedicated priority route. The priority messages are identified and only those priority messages having a length less than or equal to a threshold message length are transmitted over the priority route.

16 Claims, 5 Drawing Sheets

(56) References Cited

OTHER PUBLICATIONS

William E. Witowsky, White Paper: IP Telephone Design and Implementation Issues, Telogy Networks, Inc [online], Retrieved from the internet on Dec. 16, 2002, http://www.telogy.com/.

Ananthanayanan Ramanathan and Manish Parashar, Active Resource Management for the Differentiated Services Envirnoment, [online], Retrieved from the internet on Apr. 28, 2003, http://www.interscience.wiley.com/.

Markus Isomäki, Differentiated Service for the Internet, [online], Retrieved from the internet on Apr. 28, 2003, http://www.hut.fi/.

John Sikora and Ben Teitelbaum, Differentiated Services for Internet2 (draft) [online], Retrieved from the internet on Apr. 28, 2003, http://www.qos.internet2/may98 Workshop/html/diffserv.html.

* cited by examiner

TRAFFIC SEGMENTATION

BACKGROUND OF INVENTION

This invention relates in general to management of high speed packet network traffic and in particular to a method for reducing network traffic congestion.

The Internet supports diverse types of traffic including graphic images, file transfer data, interactive multimedia, real-time video, and voice. Despite the rapid growth in the number of Internet users, their expectations about the quality and timely display of information received from the internet backbone networks continue to be very high.

Referring now to the figures, there is shown in FIG. 1, a simplified schematic diagram of a typical internet backbone network 10. A sender 12 enters the network through a gateway, or entry router 14. The sender may be using a home personal computer that is linked to the internet by a phoneline modem, DSL or cable modem that communicates with an Internet Service Provider (ISP) that provides the entry router. A personal computer located at a business or university typically is connected to a Local Area Network (LAN) located at the business or university. The LAN would then be connected to an ISP via a high speed connection. The individual ISP's connect to larger ISP's with the largest ISP's maintaining regional or national fiber-optic "backbone" networks. It is also possible to utilize the network for audio communications by converting the audio into compressed binary data.

Regardless of the particular communication medium, the message is broken into packets of data and each packet includes both the sender's and the receiver's addresses. The addresses are assigned in accordance with an Internet Protocol (IP). The packets are received by the entry router 14 and forwarded to an adjacent intermediate gateway, or intermediate router 16, as indicated by the solid line in FIG. 1. Note that alternate routing paths between intermediate routers 16, indicated by dashed lines in FIG. 1, also are available. The intermediate router 16 reads the destination address for the packet and forwards the packet to another adjacent intermediate router 16. This process continues until a destination router 18 recognizes the destination address as belonging to a subscriber within its immediate neighborhood, or domain. The destination router 18 is responsive to the address to forward the packet directly to the receiver 20 whose address is specified.

Generally, IP is a connectionless protocol, which means that there is no continuing connection between the end points that are communicating. Thus, as each packet travels through the internet, it is treated as an independent unit of data without any relation to any other packet and the individual packets may well be sent over different paths as they cross the internet 10. As a result, the individual packets that comprise a message may well arrive at the receiver 20 out of their sending order. A Transmission Control Protocol (TCP) places the packets back into the correct sequence at the receiving end.

As the usage of the internet continues to increase, it has become desirable to provide enhanced handling for certain messages, rather than process each packet in sequence. For example, voice traffic requires a relatively uninterrupted flow of traffic while transmission of data files usually can be interrupted without undue disruption of services. Various attempts have been made to manage traffic to reflect the different levels of service requirements. Early versions applied priority handling tags to the packets. More recently, a Differentiated Services (DiffServ or DS) protocol has been adopted to provide precedence to certain classes of service by providing more complex policy of rule statements to determine how to forward a given network packet. Under the DiffServ protocol, different classes of service, such as e-mail, streaming video, large document file transfer and voice may be handled differently. Each class is may be assigned a type of service designation that specifies the desired optimization of delay, reliability and cost. For a given set of packets that comprise a message, each packet is given one of 64 possible forwarding behaviors, known as Per Hop Behaviors (PHB's). A six bit field, known as a Differentiated Services Code Point (DSCP), in the IP header specifies the PHB for a given flow of packets. The routers within a DiffServ network then handle the packets on different traffic flows by applying different PHB's based upon the settings of the DSCP, rather than sorting the packets at intermediate node within the network. In this manner, many traffic flows can be gathered into one of several predefined PHB's to reduce the processing and storage needed for classification and forwarding of packets.

The DiffServ protocol is an attempt to provide a priority queuing system that would operate in a manner similar to an interrupt system of an operating system where transient, or interrupt driven, users are allowed to momentarily interrupt the other users for a short period of time. Thus, in theory, the DiffServ protocol places high priority requests at the front of the priority queue. Unfortunately, data network messages often use very large groupings of data in a given packet or message, resulting in delays, even with priority queuing, as currently transmitting packets must complete transmission and equal priority packets must compete before "interrupt" level traffic may process. This condition is further exacerbated since similar queuing must occur at each intermediate router 16 as the packets are transmitted across the interne 10. Additionally, the complicated queuing algorithms utilized by the DiffServ protocol require a high level of processing of the packets at each intermediate router 16 along the transmission path. Accordingly, it would be desirable to provide a management mechanism for implementing admission control policy in a DiffServ network that would reduce traffic congestion.

SUMMARY OF INVENTION

This invention relates to a method for reducing network traffic congestion within a high speed packet network.

The present invention contemplates an apparatus for controlling the flow of message packets across a message packet network that includes an entry router that provides access to an internet backbone network having at least one transmission route dedicated to transmission of priority message packets. The apparatus also includes an admission controller that is connected to the entry router and adapted to receive message packets from an internet user. The admission controller is operative to examine the header of each message packet generated by the user. Upon determining that a message packet header includes a priority message identifier, the admission controller is further operative to compare the length of the priority message packet to a threshold priority message packet length. Upon determining that the priority message packet is less than or equal to the threshold priority message packet length, the admission controller forwards the priority message packet over the internet via said dedicated priority message route.

The admission controller is also operative, upon determining that the priority message is longer than the threshold priority message packet length, to remove the priority message identifier from the message header and forward the resulting message packet over the internet via a best effort route.

Additionally, upon determining that a marked priority message exceeds the threshold priority message packet length, the admission controller returns an error message to the sender. If the priority message requests were allowed to be arbitrarily long, some of the same queuing, or congestion, problems of prior art systems would result.

Various objects and advantages of this invention will become apparent to those skilled in the art from the following detailed description of the preferred embodiment, when read in light of the accompanying drawings.

DETAILED DESCRIPTION

Figure 1:
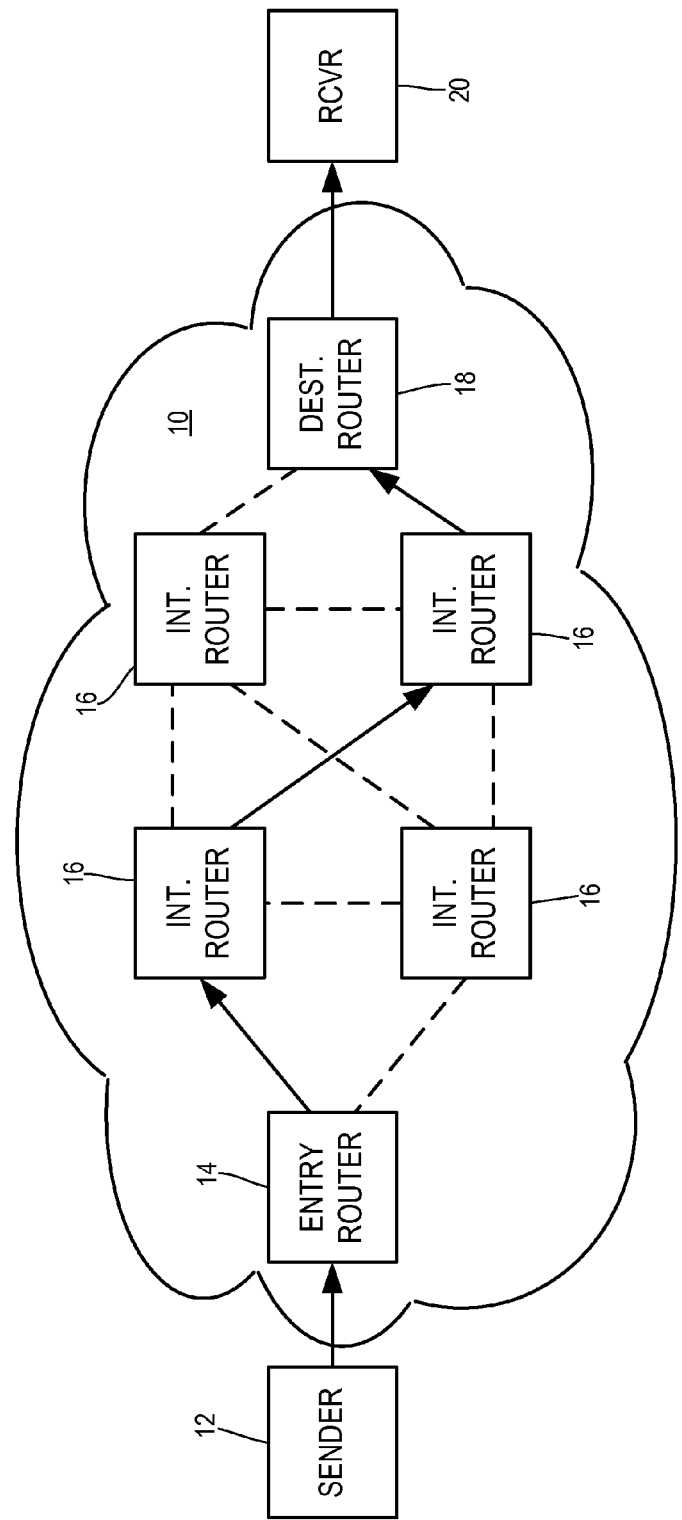
FIG. 1 is a schematic diagram that illustrates known data flow through a communications network.
Figure 2:
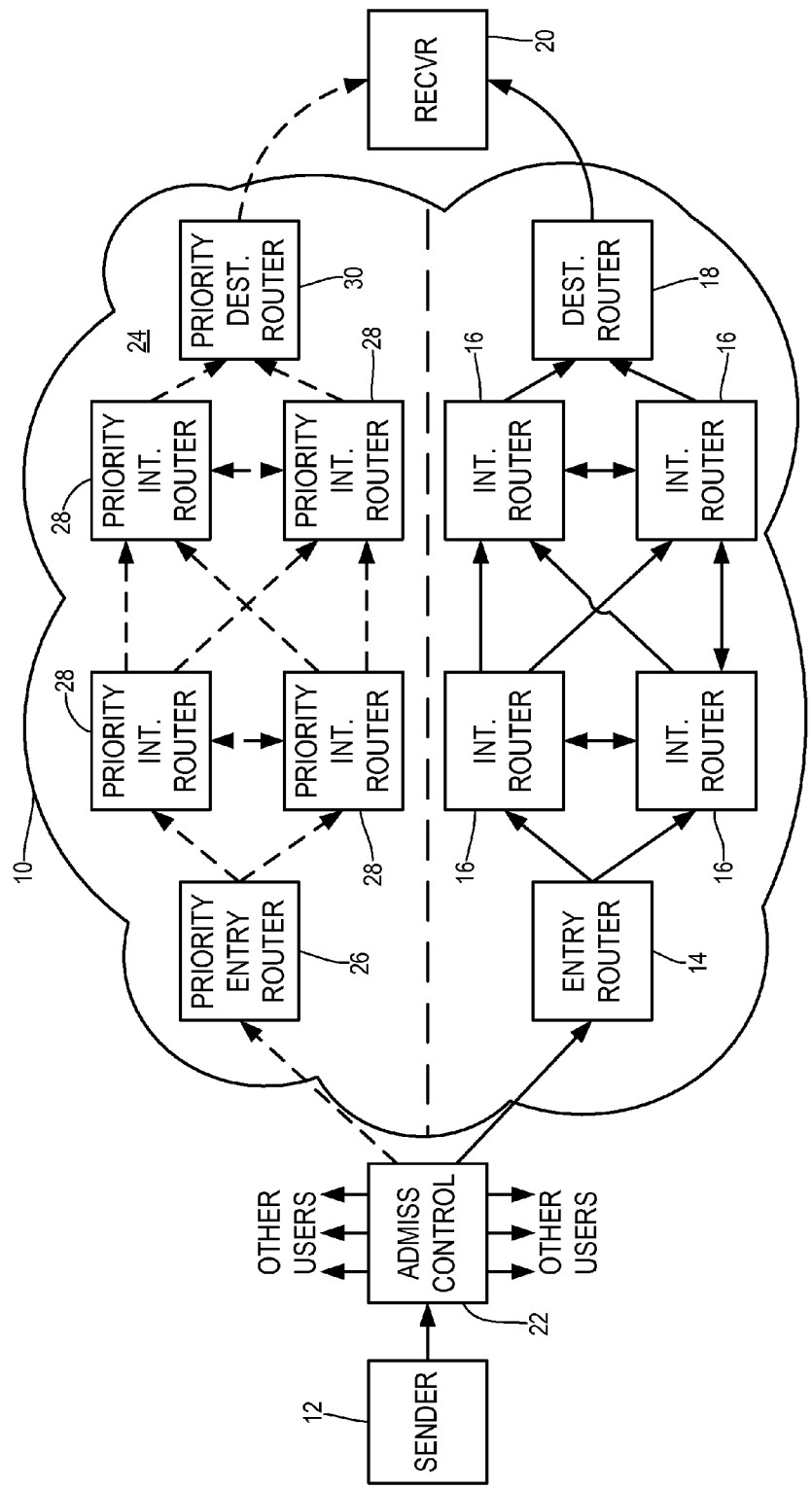
FIG. 2 is a schematic diagram that illustrates data flow through a communications network that includes an admission controller that is in accordance with the invention.

Referring again to the drawings, there is illustrated in FIG. 2, a simplified schematic diagram of an internet backbone network 10 in accordance with the present invention. Components shown in FIG. 2 that are similar to components shown in FIG. 1 have the same numerical identifiers. The present invention contemplates the provision of an admission controller 22 between the sender 12 and the entry router 14. The admission controller 22 services a plurality of users and is operative to monitor the incoming messages. While the admission controller 22 is shown outside of the internet 10, it will be appreciated that the controller 22 also may be included within the internet 10. For example, the admission controller 22 may be included within the entry router 14 and monitor all the messages received from subscribers within the entry router's domain. The arrows shown at the ends of the paths within the internet 10 indicate message transmission from the sender 12 to the receiver 20 with the packets moving from left to right in FIG. 2.

Additionally, the interne 10 has been sub-divided to provide a plurality of priority service routes and non-priority routes for transferring messages. The priority routes are shown by dashed lines that are included in the upper portion of the interne 10 that is labeled 24 in FIG. 2 and are dedicated for transmission of short priority message packets. Accordingly, the priority routes have generally smaller bandwidth requirements. For example, during a normal world wide web browsing session, such priority traffic primarily consists of control traffic such as HTTP "get" commands. Such get commands, and other similar control traffic messages are very short and occupy much less space than the reply file traffic that is sent to the user in response to the control traffic messages. Included with the priority source routes is a priority entry router 26 that is connected to a plurality of priority intermediate routers 28. Message paths terminate on a priority destination router 30 that connects to the intended receiver 20.

The non-priority routes are shown by solid lines that are included in the lower portion of the internet 10 that is labeled 32 in FIG. 2 and are dedicated for best effort service. Thus, the components contained in the lower portion 32 of FIG. 2 have greater bandwidths for handling larger message packets. Similar to FIG. 1, the lower portion 32 is entered through a entry router 14 that is connected to a plurality of intermediate routers 16. Message paths terminate on a destination router 18 that connects to the receiver 20.

The admissions controller 22 is operative to monitor and screen message packets arriving at the internet 10. The screening separates the message packets into the two portions 24 and 32. The present invention contemplates that the admissions controller 22 would separate priority packets, such as those identified by the DiffServ protocol, from the normal best effort traffic flow. The lengths of the priority message packets would be compared to a threshold packet length consistent with the bandwidth requirements for the dedicated priority routes shown in the upper portion 24 of the internet 10 in FIG. 2. Any priority packets that are too long to be handled by the policy constraints of the priority routes shown in the upper portion 24 of the internet 10 would generate an error reply.

Figure 3:
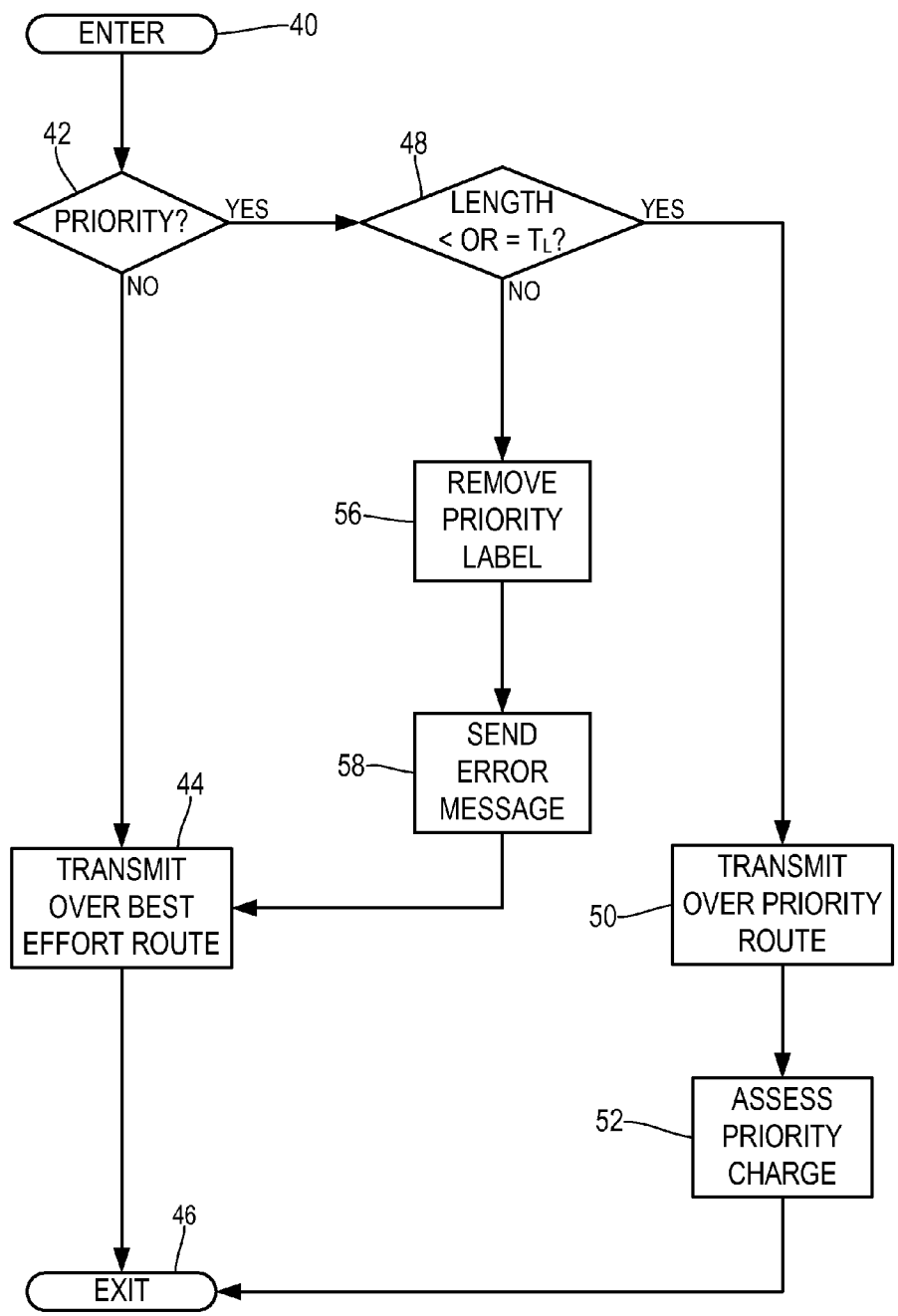
FIG. 3 is a flow chart that illustrates the operation of an algorithm for the admission controller shown in FIG. 2.

An algorithm used by the admission controller 22 for implementing the segmentation of traffic over the internet 10 in accordance with the invention is illustrated by the flow chart shown in FIG. 3. The algorithm is entered through block 40 when the admission controller 22 receives a message packet and proceeds to decision block 42. In decision block 42, the packet header is examined to determine whether the packet is a priority packet. If the message packet is not a priority packet, the algorithm advances to functional block 44 where the packet is transmitted over the interne 10 via one of best effort routes described above. With reference to FIG. 2, this means that the message packet is forwarded to the internet entry router 14. The algorithm then exits through block 46 and awaits the arrival of the next message packet at the admission controller 22. If, in decision block 42, the message packet is determined to be a priority packet in decision block 42, the algorithm then advances to decision block 48.

In decision block 48, the message packet length is compared to a threshold length, $T_L$, for admission to the priority routes. The threshold length is selected to be compatible with the transmission parameters for the priority routes. In general, the threshold length $T_L$ is selected as a function of the application since different applications have different control message lengths. For example, if the only valid control message is a HTTP get request, then the corresponding $T_L$ is selected to be slightly larger that the length of a get request. If the message packet length is less than or equal to the threshold length $T_L$ the packet qualifies as received for transmission over a priority route. Accordingly, the algorithm advances directly to functional block 50 where the packet is forwarded to the priority entry router 26 shown in FIG. 2 for transmission over one of the priority routes. After the packet is transmitted, the algorithm advances to functional block 52 where the sender is assessed a premium service charge for use of the priority route. The algorithm then exits through block 46 and awaits the arrival of the next message packet at the admission controller 22.

If, in decision block 48, the message packet length is greater than the threshold length $T_L$, the message is denied entry into the priority routes and the algorithm advances to decision block 56. In functional block 56 the priority message code is removed from the message header to prevent confusion within the intermediate routers 16. The algorithm continues to functional block 58 where an error message is returned to the sender. The algorithm then advances to functional block 44 where the message is transmitted over the internet 10 via one of the best effort routes. The algorithm then exits through block 46 and awaits the arrival of the next message packet at the admission controller 22.

The algorithm shown in FIG. 3 is intended to be exemplary and it will be appreciated that the invention also may be implemented with other algorithms than the one shown.

Figure 4:
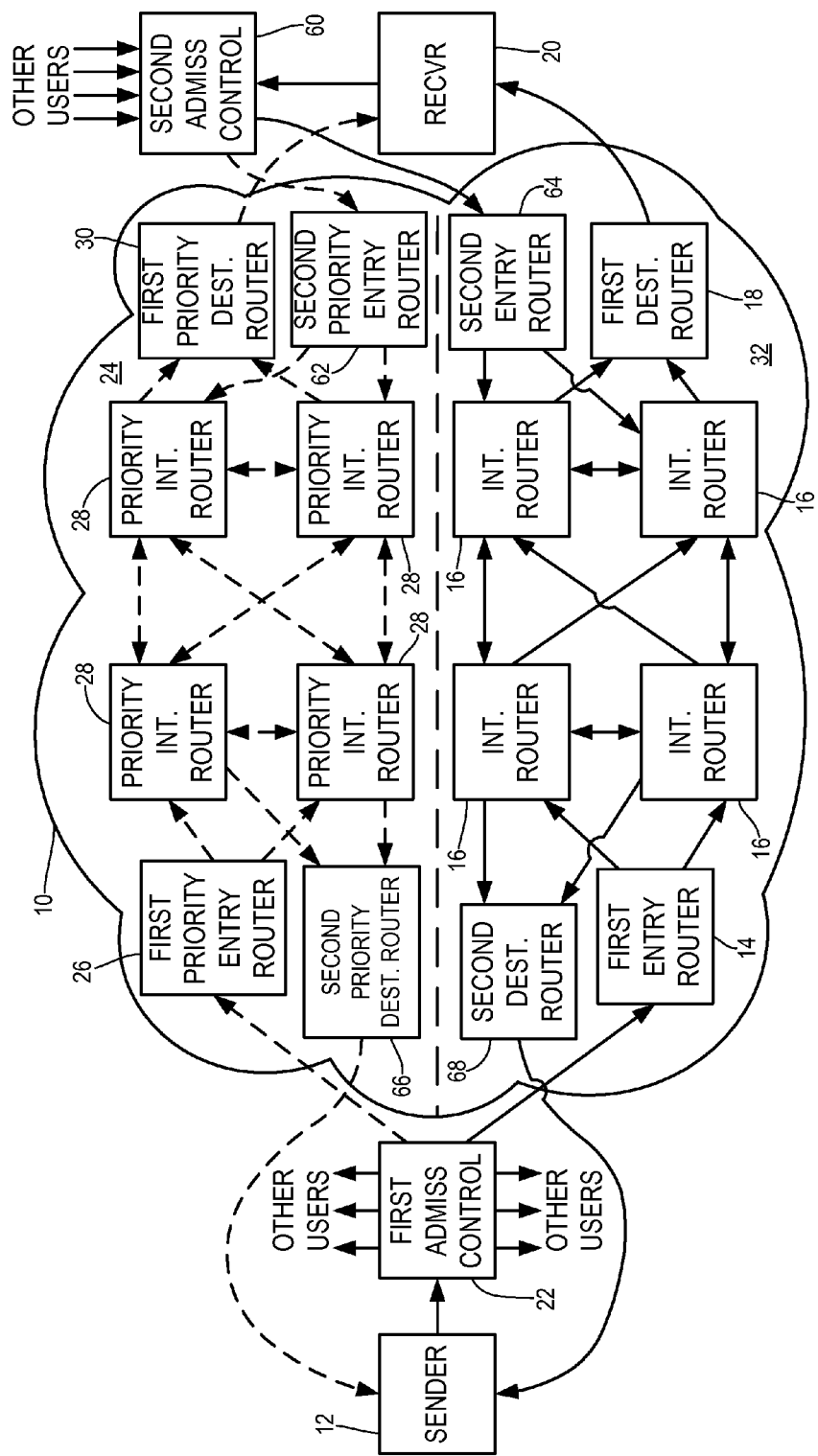
FIG. 4 is a schematic diagram that illustrates bi-directional data flow through a communications network that is in accordance with the invention.

For simplicity, only unidirectional movement has been shown in FIG. 2, with the message packets moving from left to right. However, actual transmission is bi-directional. Accordingly, the invention contemplates a system for bi-directional transmission of message packets as shown in FIG. 4, where components that are similar to components shown in FIG. 3 have the same numerical designators. In FIG. 4, as second admission controller 60 has been added to the right side of the figure to receive outgoing messages generated by users in the domain at the right of FIG. 4, such as the receiver 20. The second admission controller 60 is connected to a second priority entry router 62 and a second non-priority entry router 64. In FIG. 4, the arrows on the paths indicate the direction of the message transmission. Thus, the arrows connecting the second admission controller 60 to the second entry routers 62 and 64 generally point to the left in FIG. 4. For clarity, the original entry router 14 and priority entry router 26 have been relabeled as first entry router and first priority entry router in FIG. 4. The second entry routers 62 and 64 are connected to the priority intermediate routers 28 and the non-priority intermediate routers 16, respectively. Double headed arrows connecting the intermediate routers 16 and 28 are indicative of the bi-directional flow of message packets therebetween. On the left side of FIG. 4, a second priority destination router 66 and a second non-priority destination router 68 have been added to provide an interface between the intermediate routers 16 and 28 and the sender 12 for delivering messages. Again for clarity, the original non-priority destination router 18 and original priority destination router 30 have been relabeled as first destination router and first priority destination router, respectively. The invention contemplates that the second admission controller 60 operates in the same manner as described above, and as illustrated by the flow chart shown in FIG. 3.

Figure 5:
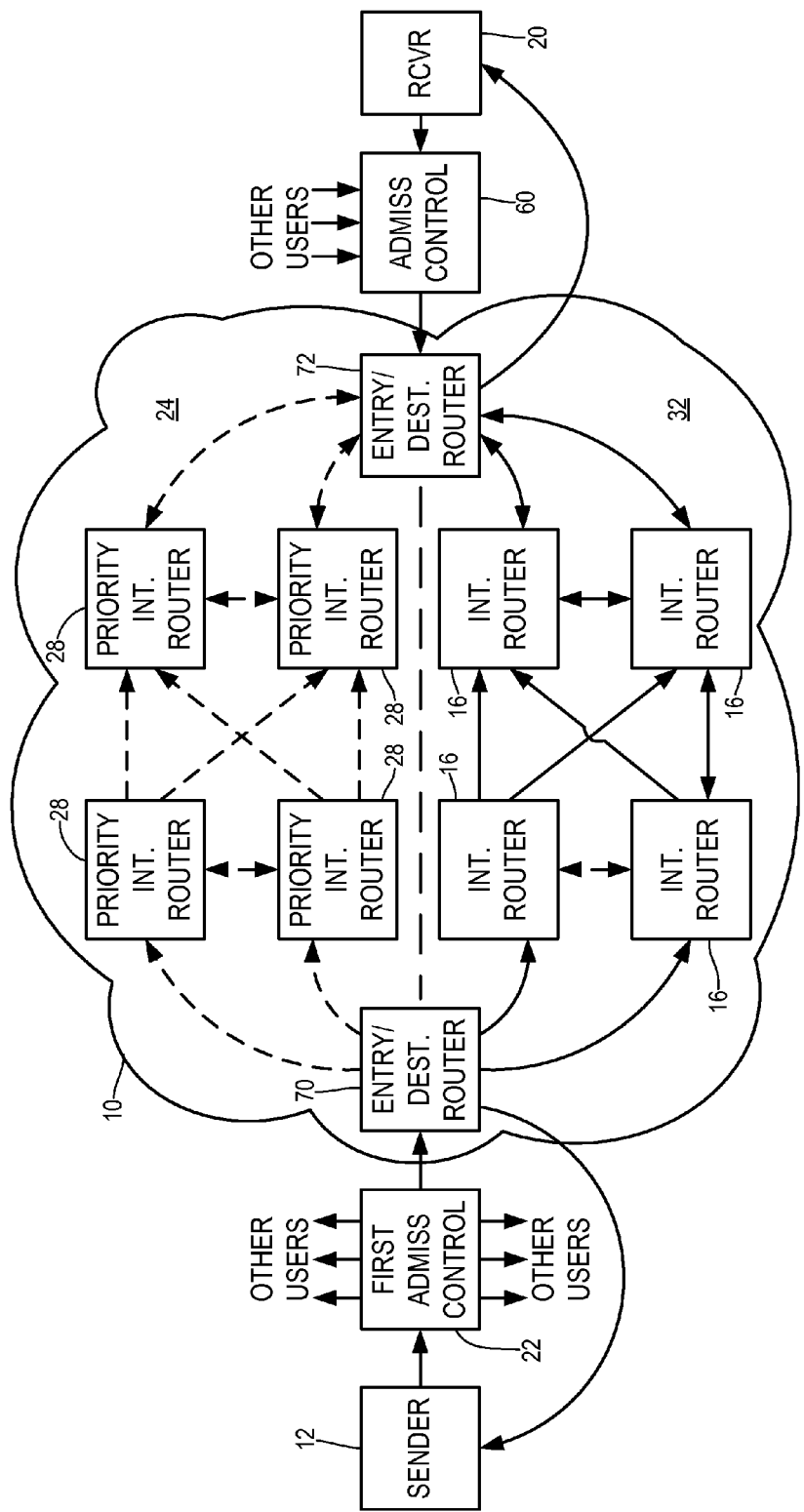
FIG. 5 is a schematic diagram of an alternate embodiment of the invention.

An alternate embodiment of the invention is illustrated in FIG. 5 where components that are similar to components shown in earlier figures have the same numerical designators. In FIG. 5, function of the separate entry and destination routers have been combined into single bi-directional entry/destination routers 70 and 72 that provide an interface between the users and the internet. The alternate embodiment contemplates that after the first and second admissions controllers 22 and 60 remove the priority label for non-qualifying message packets, as shown in functional block 56 of FIG. 3, the messages are forwarded to one of the combined entry/destination controllers 70 or 72. The entry/destination controllers 70 and 72 are operative to read the header and, upon finding a priority message code, forward the message along one of the dedicated priority routes shown in the upper portion 24 of FIG. 5. If the entry/destination controllers 70 and 72 do not find a priority message code, the message is forwarded along one of the best effort routes shown in the lower portion 24 of FIG. 5.

The invention further contemplates another alternate embodiment in which the number of available dedicated priority paths across the internet 10 is variable. In the alternate embodiment the admission controllers 22 and 60 are operative to continuously monitor the level of priority and non-priority packet traffic on the internet 10 and move routes between the priority routing region 24 and the non-priority routing region 32. Thus, if priority traffic demand falls off, some of the designated priority routes may be made available for best effort transmission of non-priority messages. Similarly, if priority traffic demand increases, some of the best effort routes can become dedicated for transmission of priority message packets only. Alternately, the redesignation of routes may be controlled by preset parameters, such as, for example time of day where it is known that the frequency of priority messages falls off during certain time periods.

By separating the transmission routes, the network links can be optimized for specific uses, thereby matching user requirements with network capabilities. As a result, it is expected that the user perception of slow network operation will be reduced without having to greatly overbuild the network to accommodate the traffic.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for controlling the flow of message packets across a message packet network comprising:
    an entry router that provides access to the message packet network, the message packet network having at least one transmission route dedicated to the transmission of priority message packets having a selected message length and application; and
    an admission controller connected to said entry router and adapted to receive message packets from a network user; said admission controller operative to examine the header of each message packet generated by said user and, upon determining that a message packet includes a priority message identifier in said message packet header to compare the length of said priority message packet to a fixed threshold priority message packet length that is selected as a function of said application of said priority message packets, said admission controller being further operable, upon determining that said priority message packet is one of less than and equal to said threshold priority message packet length to forward said priority message packet over said message packet network via said dedicated priority transmission route, said admission controller also being operative, upon determining that said priority message packet is longer than said threshold priority message packet length to remove said priority message identifier from said message packet header and to then forward the resulting message packet over the message packet network via a non-priority message route.

2. The apparatus according to claim 1 wherein said threshold priority message packet length is also a function of an application control message length.

3. The apparatus according to claim 2 wherein said priority message packet is a get request and further wherein said threshold priority message packet length is larger than the length of a HTTP get request and smaller than the length of a next larger control message command to set a message packet length such that other types of control message commands based on the message length are not allowed to be sent over said at least one dedicated transmission route.

4. The apparatus according to claim 2 wherein said backbone network is the internet and said message is a get request and further wherein said threshold priority message packet length is set to a length to only allow the length of a HTTP get request.

5. The apparatus according to claim 3 wherein said admission controller is further operative, upon determining that said priority message packet is longer than said threshold priority message packet length to send an error message to said network user.

6. The apparatus according to claim 3 wherein, subsequent to forwarding said priority message packet over the message packet network, said controller is further operative to assess the user a priority route service charge that is based upon the use of said dedicated priority message route.

7. The apparatus according to claim 5 wherein said message packet network is a backbone network.

8. The apparatus according to claim 7 wherein said backbone network is the internet.

9. A method for controlling the flow of message packets across a message packet network comprising the steps of:
  (a) providing an admission controller adapted to receive and screen message packets from a network user, the admission controller connected to the message packet network, the message packet network including at least one transmission route dedicated to transmission of priority message packets having a selected message length and application;
  (b) receiving a message packet from a network user for transmission over the message packet network;
  (c) examining the message packet header to determine that the message header includes a priority message identifier;
  (d) comparing the length of the message packet to a fixed threshold priority message packet length that is selected as a function of said application of said priority message packets; and
  (e) forwarding the priority message over the dedicated priority message route only upon determining that the priority message length is one of less than and equal to the threshold priority message packet length and forwarding the message over a non-priority message route upon determining that the message length is greater than the threshold priority message packet length.

10. The method according to claim 9 further including, upon determining in step (c) that the message header does not include a priority message identifier, forwarding the message over the network via the non-priority message route.

11. The method according to claim 10 further including, upon determining in step (d) that the length of the priority message packet is greater than the threshold priority message packet length, removing the priority message identifier from the message header.

12. The method according to claim 11 further including, upon determining in step (d) that the length of the priority message packet is greater than the threshold priority message packet length, sending an error message to the network user.

13. The method according to claim 11 further including, after forwarding a message over the internet via a dedicated priority message route, assessing the user a priority route service charge.

14. The method according to claim 11 wherein, during step (d), the threshold priority message packet length compared to the length of the message packet is also a function of an application control message length.

15. The method according to claim 14 wherein the message packet being compared to the threshold priority message packet length is a get request and further wherein the threshold priority message packet length is larger than the length of a HTTP get request and smaller than the length of a next larger control message command.

16. The method according to claim 14 wherein the message packet being compared to the threshold priority message packet length is a get request and further wherein the threshold priority message packet length also has a length to only allow transmission of messages having the length of a HTTP get request over the priority message transmission route.

* * * * *